April 25, 1967     L. SLAYBAUGH     3,315,619
APPARATUS FOR THE PRODUCTION OF FOOD PRODUCT
Filed Sept. 14, 1964     2 Sheets-Sheet 2
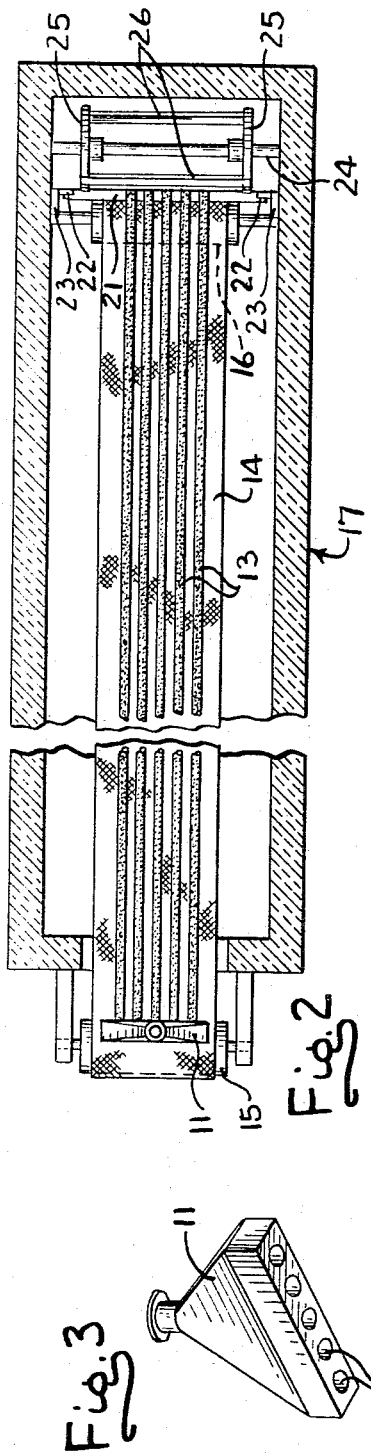
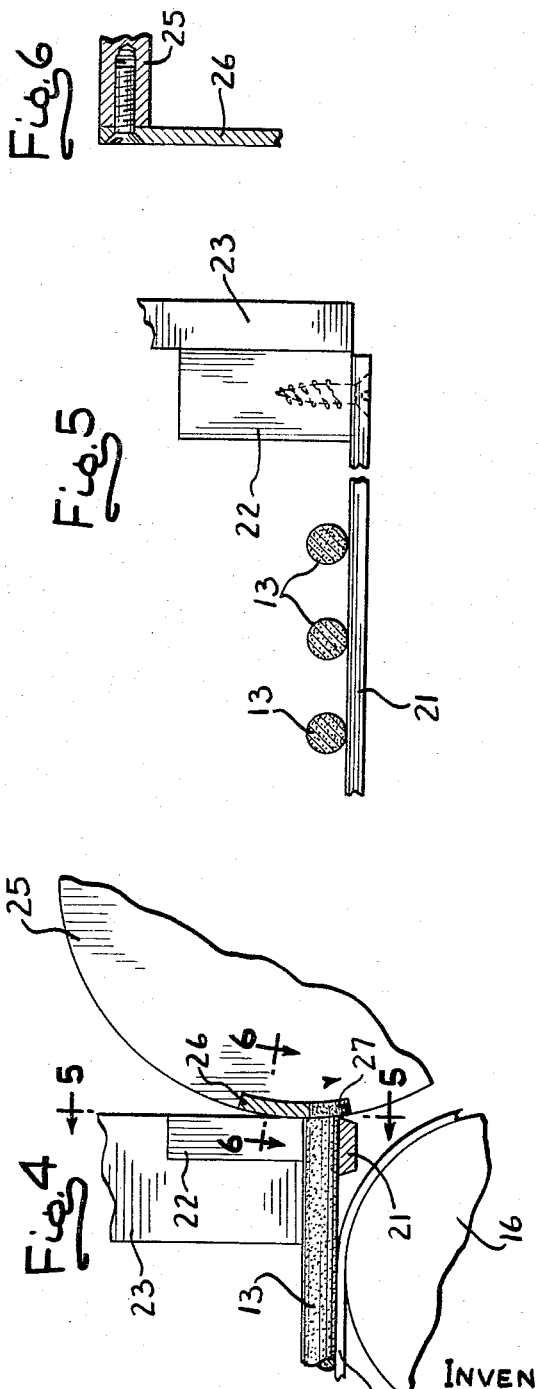
INVENTOR
LYLE SLAYBAUGH
by: Gary, Parker, Juettner & Cullinan
ATTYS.

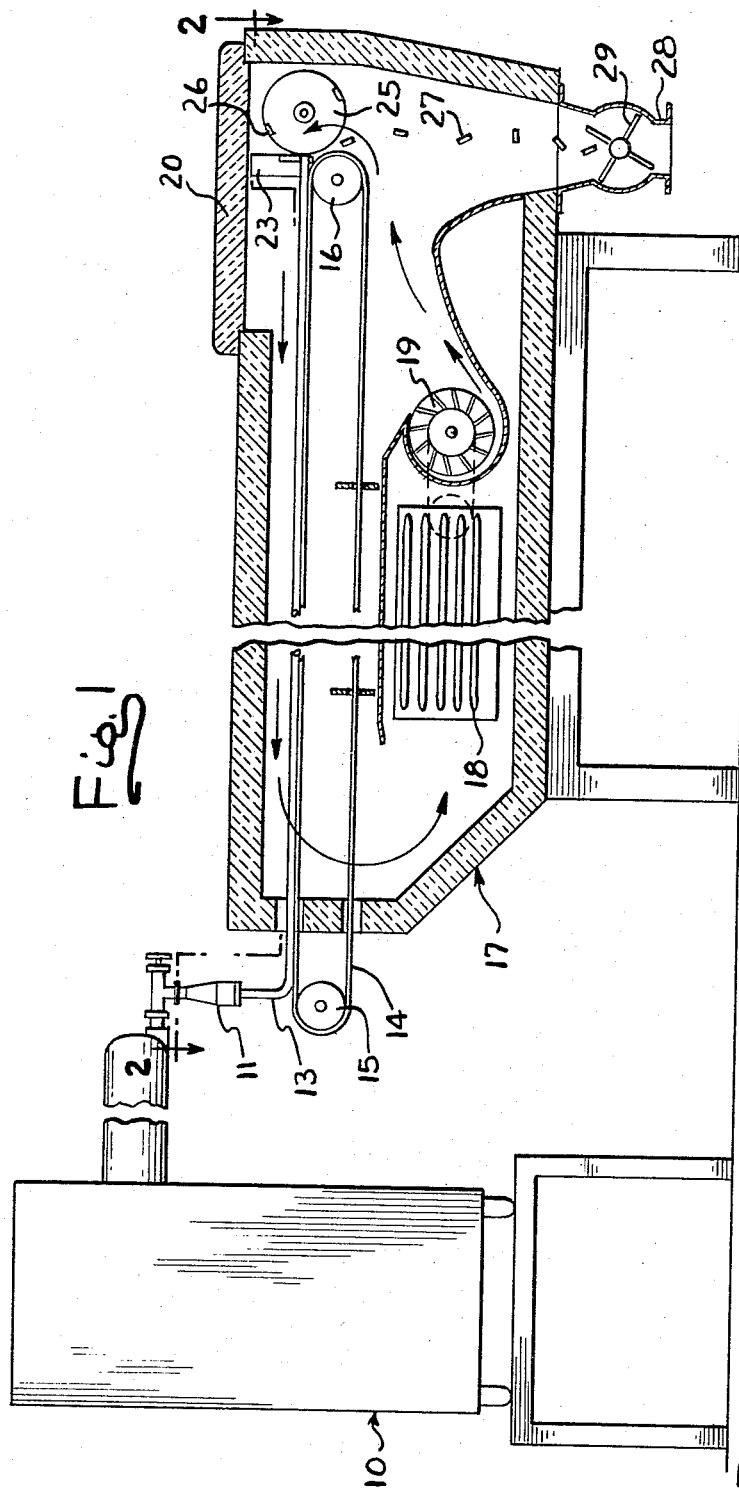

… … …

United States Patent Office 3,315,619
Patented Apr. 25, 1967

3,315,619
APPARATUS FOR THE PRODUCTION OF FOOD PRODUCT
Lyle Slaybaugh, Battle Creek, Mich., assignor to Kellogg Company, Battle Creek, Mich., a corporation of Delaware
Filed Sept. 14, 1964, Ser. No. 396,225
2 Claims. (Cl. 107—69)

This invention relates to novel apparatus for the production of sliced frozen fruit products and more particularly to the production of sliced frozen fruit composition extrudate suitable for use per se or for vacuum freeze drying, from a fruit puree.

It is a particular object of the present invention to provide novel apparatus for continuously extruding said fruit composition in partially frozen plastic condition in the form of elongated strips, then to continually move said strips through a freezing chamber wherein the strips are frozen to substantially rigid form, and to thereafter sever said strips into pieces of desired thickness or length which are storage stable in the cold and are thereupon adapted for use per se such as in pies, puddings, and ice cream, or further subjected to vacuum freeze drying.

The objects of the invention, its details of construction, arrangement of parts and economies thereof, will be further apparent from a consideration of the following specification and accompanying drawings, wherein:

FIG. 1 is a substantially diagrammatic elevational view partly in section of an arrangement of the apparatus of the present invention.

FIG. 2 is a diagrammatic plan view of the apparatus of FIG. 1, partially in section, on the line 2—2 of FIG. 1.

FIG. 3 is a diagrammatic view of the extruder head shown in the previous figures.

FIG. 4 is an enlarged detailed view, partly in section, taken at the discharge end of the freezer compartment of FIGS. 1 and 2, illustrating the product severing means.

FIG. 5 is a fragmentary detail sectional view taken on the line 5—5 of FIG. 4.

FIG. 6 is another fragmentary sectional detail view taken on the line 6—6 of FIG. 4.

Referring to the drawings, reference numeral 10 generally indicates the unit wherein a fruit puree composition such as one composed, for example, of bananas and from about 5 to about 15 percent by weight of gelatinized starch, and optionally containing up to about 1 percent by weight of edible gums, forming a dough, is mixed with a gas such as air or nitrogen under pressure delivered thereto by pump means not shown. The unit 10 may be a commercial unit such as a Cherry Burrell ice cream freezer.

After the gas is injected into the dough to give it a porous texture similar to that of ice cream, at a density of from about 0.5 to about 0.9 gram per cubic centimeter, and partially frozen or cooled to a temperature of from about 20 to about 25° F. to incipient crystal formation and a plastic condition, the dough is extruded through the head 11 having a plurality of cylindrical openings 12. The thus partially frozen fruit dough issues from the extruder head 11 in the form of strips 13 of desired cross-sectional shape, such as, for example, cylindrical, substantially the diameter of an average banana, or of a sliced berry such as a strawberry, blackberry, etc. Another shape can be semi-cylindrical so that when sliced the pieces simulate sections of peaches, pears, apples, apricots, etc. These strips 13 are received on the endless belt 14 trained about the rollers 15, 16, one of which is driven, and are carried by the upper run of the conveyor belt 14 through the elongated refrigeration chamber generally indicated as 17.

As appears from FIGS. 1 and 2, one end of the conveyor belt 14 and roller 15 are disposed outwardly of the refrigeration chamber 17, whereat the extrudate 13 is initially deposited thereon. The refrigeration chamber 17 is provided with suitable refrigerator coils 18 and air circulating fan means 19, whereby refrigerated air is circulated throughout the chamber, and over the extrudate passing therethrough. The chamber 17 is suitably provided with a cover 20 at the delivery end thereof for observation and access to the operation conducted therein, particularly the means for severing the extrudate.

The conveyor belt 14 may be composed of substantially imperforate material such as a belt of closely woven canvas, or sheet plastic or metal, but is preferably composed of a perforated or open mesh material permitting better circulation therethrough of the refrigerated air in the chamber 17 and into intimate contact about the moving strips 13.

As the extrudate 13 passes through the chamber 17 it is further frozen therein to a substantially rigid condition, the atmosphere of the chamber 17 being cooled to a temperature of about −20° F. and the extrudate in its passage therethrough frozen to a temperature of from about 5 to about 15° F. The frozen strips 13 as they pass on the conveyor belt 14 over the roller 16 are received on the platform or knife component 21 extending transversely of the belt 14 and parallel to the roller 16. This platform or knife 21 is secured to the support block 22 as shown in the detail of FIG. 5, the support block being in turn secured to the vertical support 23.

Disposed transversely of the conveyor belt 14 and adjacent to its passage over roller 16, and parallel and adjacent to the platform or knife member 21, is a rotatable cutter mounted on the axis 24 and driven by suitable means not shown which can be correlated to the speed of conveyor belt 14.

The rotatable cutter comprises a plurality of spaced discs 25, 25 mounted on the axis 24, and a plurality of knives 26 secured to the peripheral edges of the discs 25 and in a direction substantially tangential thereto. Thus as the frozen strips 13 are delivered to the platform component 21, the plurality of strips 13 on the conveyor 14 are jointly severed by means of the knives 26 into strips of desired thickness or length 27 and delivered by gravity from the chamber 17 through the discharge neck 28. In this discharge end there may be interposed an airlock 29, or in lieu thereof, though not shown, there may be merely disposed at the bottom of the discharge neck 28 and releasably secured thereto a receptacle which temporarily closes the end 28 until full and replaced.

The slices 27 can be stored and transported in frozen condition for use per se as hereinbefore mentioned, or subsequently subjected to conventional vacuum freeze drying to produce porous particles, which when, for example, mixed with milk rehydrate and closely resemble fresh fruit in odor, taste and texture.

Although I have shown and described the preferred embodiment of my invention it will be understood by those skilled in the art that changes may be made in the details thereof without departing from its scope as comprehended by the following claims.

I claim:

1. Apparatus for the production of a sliced frozen fruit product comprising means for extruding a partly frozen plastic fruit dough in continuous strip form including an extruder head formed with a plurality of spaced openings each of substantially the cross-sectional contour of a slice of the original fruit, means for receiving therefrom and for further freezing said strip material to substantially rigid condition comprising a substantially horizontally disposed elongated refrigeration chamber and an endless conveyor belt disposed therein, and means disposed endwise of said conveyor and within said chamber for continuously severing said further frozen strip material in a transverse direction into pieces of desired thickness comprising a plurality of spaced rotatable discs and a plurality of spaced knives secured to the peripheries of said discs in a substantially tangential direction, and air lock exit means for discharging said pieces from said chamber.

2. Apparatus for the production of a sliced frozen fruit product comprising means for extruding a partly frozen plastic fruit dough into a plurality of parallel continuous strips substantially to the diameter of a banana, means for receiving therefrom and for further freezing said strip material to substantially rigid condition comprising a substantially horizontally disposed elongated refrigeration chamber, means for cooling the atmosphere in said chamber to about −20° F., an endless conveyor belt disposed therein and a transversely disposed fixed receiving platform adjacent the delivery end of said conveyor disposed in said chamber, and means for continuously and simultaneously severing said strips in a transverse direction into pieces of desired thickness comprising knife means disposed in said chamber carried by rotatable discs disposed peripherally thereon in a direction substantially tangential to the direction of rotation and parallel and adjacent to said platform, and air lock chamber discharge means for discharging the cut frozen pieces.

References Cited by the Examiner

UNITED STATES PATENTS

| | | | |
|---|---|---|---|
| 2,282,525 | 5/1942 | Maguire | 62—320 X |
| 2,532,131 | 11/1950 | Van Voorst | 107—1.4 |
| 2,643,526 | 6/1953 | Turner | 107—54.4 X |
| 2,876,111 | 3/1959 | Holzcker | 62—114 X |

FOREIGN PATENTS 165,984   5/1950   Austria.

WALTER A. SCHEEL, *Primary Examiner.*

J. SHEA, *Assistant Examiner.*